UNITED STATES PATENT OFFICE.

EPHRAIM B. MELTON, OF DECATUR, TEXAS.

PROCESS OF PRESERVING.

No. 821,947.　　　　Specification of Letters Patent.　　　　Patented May 29, 1906.

Application filed July 25, 1905. Serial No. 271,250.

*To all whom it may concern:*

Be it known that I, EPHRAIM B. MELTON, a citizen of the United States, residing at Decatur, in the county of Wise and State of Texas, have invented new and useful Improvements in Methods of Preserving, of which the following is a specification.

My invention is a method of preserving corn, and has for its object the preservation of corn for table use without canning it. This object is effected by treating the corn as hereinafter stated, following such treatment by evaporation or drying, so that dried corn is provided of a quality fit for table use.

In carrying out my process the corn is left on the cob and is washed in a weak solution of salicylic acid and lime-water, whereby it is cleaned and purified. The next step is to subject the corn to the vapor rising from slaking lime, which cooks or steams it. This can conveniently be done by placing the corn in a closed vessel or receptacle or on a screen or shelf therein and placing lime and water in the bottom thereof, so that the vapor rising from the lime and water as it slakes will impregnate the corn. After this the corn is cut from the cob and dried or evaporated. Any ordinary evaporating apparatus can be used or it can be sun-dried.

The result of subjecting the corn to the vapor rising from slaking lime is that it prevents it from being tough when recooked for table use. It also prevents the corn from fermenting or souring while drying. It has been determined by experiments that ordinary steam will not answer the same purpose, as it renders the corn tough and also liable to sour while drying.

To prepare the corn for the table, it is boiled in the same manner as ordinary dried fruits or vegetables.

Besides corn other vegetables and also fruits can be preserved in the manner described herein.

Having thus described my invention, what is claimed as new, and desired to be secured by Letters Patent, is—

A process of preserving consisting in washing the article in salicylic acid and lime-water, and then subjecting the article to the vapor rising from slaking lime.

In testimony whereof I have signed my name to this specification in the presence of two subscribing witnesses.

EPHRAIM B. MELTON.

Witnesses:
　J. H. CATES,
　J. S. KENDALL.